United States Patent Office 2,969,791
Patented Jan. 31, 1961

---

2,969,791

RIGID SUPPORTING DRESSING

Bo Thuresson Af Ekenstam, Bofors, Allan Richard Benjamin Furendal, Karlskoga, and Bror Holger Fredrik Von Fieandt, Upplands-Vasby, Sweden, assignors to Aktiebolaget Bofors, Bofors, Sweden, a corporation of Sweden Filed Apr. 30, 1957, Ser. No. 655,965

Claims priority, application Sweden Apr. 30, 1956

21 Claims. (Cl. 128—90)

This invention relates to the rigid supporting dressing. In particular it is directed to improved light-weight dressings of rigid form as used, for example, in supporting fractured bones; and the methods of manufacturing the same.

In pending U.S. application, Serial No. 564,841, we have described a supporting dressing. In that application we show the manufacture of the therein-described dressing by dipping a loosely woven fabric into a mixture of an emulsion of a hard plastic material and a soft plastic material. The emulsions of these two different types of plastics form a coating around each of the individual threads of the webbed fabric. In such coatings the soft plastic material acts as a binding agent. If a solvent is added to the plastic coated webbed fabric manufactured as above described, the coating is transformed into a film after the solvent evaporates. The film around each thread has the form of a tube or pipe. In case the solvent is added to the plastic coated webbed material of the above kind and is allowed to evaporate after the web has been applied to an injured area, as for example a human arm, the material will achieve the same character as a so-called plaster of Paris. Thus, the web acts as a supporting dressing.

Although our aforesaid plastic coated web may be applied in a fully satisfactory manner, certain desiderata still exist. One of these is the elimination of stickiness of the web. In fact, the web possesses a certain amount of stickiness after the affixation thereto of the plastic material and prior to the addition of the solvent. Such stickiness is attributable to the soft plastic material which acts as binding agent. Another desideratum is an increase in the hardness of the web after the evaporation of the solvent. The soft plastic material used in said pending application, as a binding agent, causes a decrease of the hardness of the plastic film, the hardness being less than would be if the film were formed solely from the hard plastic material.

Accordingly, it is among the principal objects of this invention to provide means for attaining the aforesaid desiderata in such a dressing.

Such objects are attained by substituting the soft plastic material heretofore used as the binding agent for the hard plastic with a binding agent which is insoluble in the solvent that softens the hard plastic material.

Such objectives are attained by dipping a woven fabric in an emulsion of a hard plastic material including a binding agent, the weave of the fabric being so loose or open that the emulsion and the binding agent adhere in the form of small globules to each thread of the web. The thus-treated web, after drying, is applied as a supporting dressing, the web being dipped in or sprayed with a solvent, either prior to or after the application. The solvent is allowed to evaporate thereby causing the formation of a film of plastic material around each thread.

The feature of the instant invention is that the binding agent is insoluble in the solvent that acts on the hard plastic material but is soluble in water.

In consequence of the present invention we obtain, in addition to the above mentioned advantages, the further advantage that, upon the addition of a solvent to the web which has been treated with a plastic emulsion and an aforesaid binding agent, the dissolved plastic will not flow out and wholly or partly stop the masks of the web. Thus, a web, less loosely woven than those heretofore employed may be used for our new supporting dressings.

Among the binding agents which fulfill the requirements in accordance with the present invention, are: polyvinyl alcohol, casein, water-soluble cellulose derivatives, as for example, the sodium salt of carboxymethylcellulose, water-soluble acrylic products, as for example, polyacrylamide and salts of polymethacrylic acid, polyvinylpyrrolidone, water glass and other inorganic and inorganic colloids.

By using a colloid as a binding agent there is obtained a further advantage in that the colloids simultaneously serve as a so-called protective colloid for the emulsion. As a consequence thereof, the emulsion is rendered more stable against mechanical influences. Such stability is of great importance during the application of the plastic emulsion when the treated web is to be passed through rolls as for example, between a pair of rubber rolls. If the emulsion is not sufficiently stable against mechanical influence, it will coagulate during that step of the manufacturing process and form a coating on the rolls thereby hindering continuous rolling.

Suitable plastic materials which may be used in accordance with the present invention are: polymethylmethacrylate, polyisobutylmethacrylate, polystyrene and other plastics having similar properties.

Solvents which are useful in accordance with this invention may be selected either singularly or in mixtures from solvents which are relatively low-boiling and non-toxic. Examples of such solvents are: ketones, as for example, ethylacetate, and methyl acetate; acetals, as for example, dimethylformal, diethylformal and dimethylacetal; chlorinated hydrocarbons, for example, methylenechloride, ethylchloride, propylchloride, butylchloride, dichloroethylene, etc.

To control the evaporation velocity and/or the flammability of the solvent, there may be added to the solvents mentioned above, one or more other compounds or materials which, per se, are not solvents for the plastics. Examples of such modifiers are: low-boiling ethers, paraffin-hydrocarbons and fluoro-chloro carbon compounds.

A fuller understanding of the invention will be apparent from the following illustrative examples taken in connection with the accompanying drawing wherein.

Figure 1:
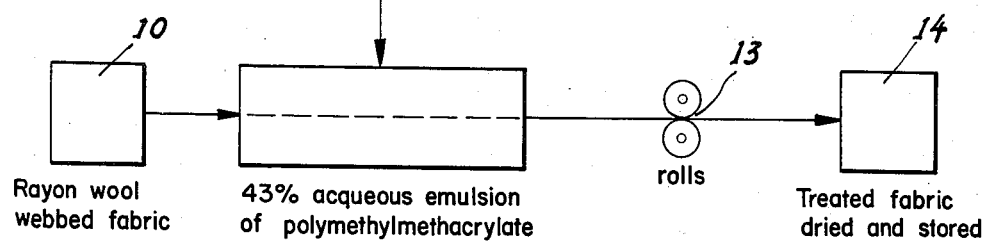
Fig. 1 is a flow sheet of the process of making a treated fabric for use as a dressing.
Figure 2:
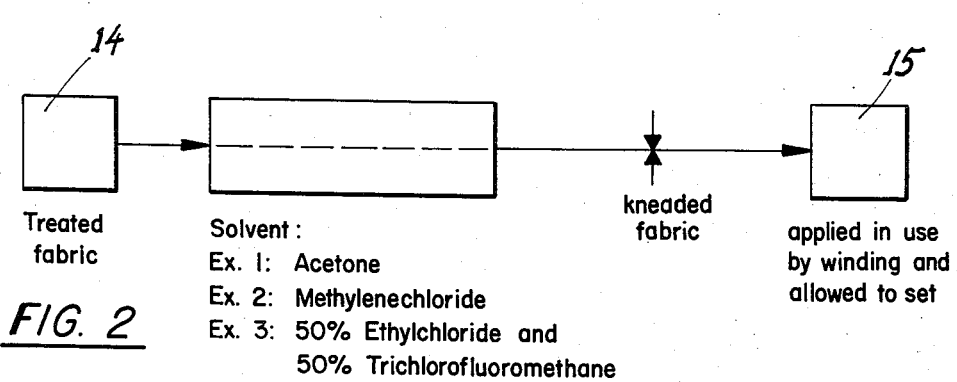
Fig. 2 is a flow sheet of the process of preparing the dressing from the treated fabric produced by the process of Fig. 1.
Figure 3:
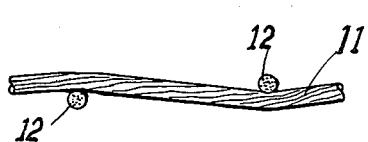
Fig. 3 is a cross-sectional view on an enlarged scale of a fragmentary portion of the fabric prior to the treatment showing the relationship of a warp thread and woof threads.

In all of the examples a webbed fabric of rayon wool is used. The web 10 has a mesh count of three threads 11 per centimeter in the warp, and four threads 12 per centimeter in the woof as shown in Fig. 3. The fabric has a weight of 87 grams per square meter.

Furthermore, in all the examples an emulsion of polymethylmethacrylate is used, the emulsion having a dry content of 43%.

It will be understood that the following examples are merely illustrative and that other types of webs and other types of plastic emulsions may be used.

Example 1

A 10% solution of polyvinyl alcohol (hydrolyzed 86–89% from polyvinyl acetate) in water is added to a 43% aqueous emulsion of polymethylmethacrylate in an amount to provide the emulsion with a polyvinyl alcohol content of 5% with respect to the polymethylmethacrylate. The fabric as described above, is dipped into said mixture. After dipping, the web is then passed between a pair of rubber rolls 13 in a rolling mill, the rolls being adjusted so that in the dry web the plastic material constitutes 60% of its weight.

Figure 4:
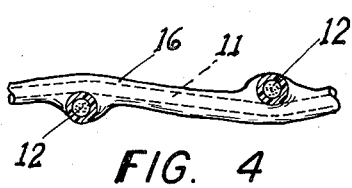
Fig. 4 is a view of the fragmentary portion illustrated in Fig. 3 after being treated.
Figure 5:
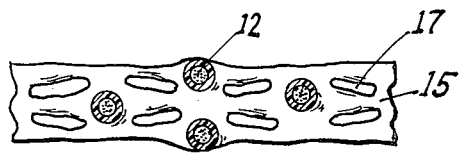
Fig. 5 is a cross-sectional view on an enlarged scale of a fragmentary portion of a dressing prepared from the treated fabric.

The thus-treated dried web 14, consisted of the web coated with plastic 16 as shown in Fig. 4 is immersed in acetone for two minutes. Then the acetone-treated web is lightly kneaded to remove excess acetone therefrom. The web is then applied to an injured area, as for example, a fractured human arm. The web is applied to injured area in six to eight windings; after thirty mintes, the dressing 15 (see Fig. 5) attains relatively good hardness and after two hours it attains maximum hardness. This dressing has very high strength—higher than that of a plaster cast. Since the dressing is porous, having pores 17, it allows for passage of air to the skin covered by the dressing. Furthermore, the dressing allows examinations of the injured limb to be made by means of X-rays, a possibility which does not exist where plaster casts are used.

Example 2

A 10% solution of casein in water, the solution being prepared by dissolving 10 grams of so-called acid casein in 9 grams of a 2% aqueous ammonia solution, is added to the plastic emulsion described in Example 1. The casein solution is added in such amount that the emulsion contains 3% of casein with respect to the amount of the plastic material.

The emulsion is applied to the woven fabric in the same manner as described in Example 1, so that the web, when dried, contains 60% of the plastic material. The prepared web is immersed for thirty seconds in methylenechloride as a solvent for the plastic material. After such immersion, the web is used in the same manner as that described in Example 1, and the result obtained is the same as set forth in Example 1.

Example 3

In this example, the fabric and the plastic emulsion are the same as in the foregoing examples. The binbing agent used in this case, however, is a 32% solution of water-glass, which is added in such amount to the plastic emulsion that it contains 5% of water-glass with respect to the amount of the plastic material present.

The web thus prepared, after drying, is immersed in a solvent consisting of 50% ethylchloride and 50% trichlorofluoromethane. The solvent-treated web is applied as a dressing in the same manner as that described in the foregoing examples.

By the use of the low-boiling solvent in this instance there is achieved the advantage of attaining a rapidly drying dressing. Thus, this dressing formed of six to eight windings attains maximum strength in a drying period of thirty minutes.

The amount of the binding agent used in preparing the coating fluid may advantageously be in the approximate range of 1% to 10%, and preferably from 2% to 6%, with respect to the amount of the plastic material present in said fluid.

The emulsion in the examples is made according to the following formula:

(1) Water, 1.720 gr.
(2) Turkey red oil 60 gr.
(3) Dioctylester of sodium sulfosuccinic acid, 24 gr.
(4) Ammonium persulphate, 1.2 gr. (2×0.6 gr.)
(5) Monomer, 1.200 gr.

The components 1–3 are first solved and heated up to 80° C., whereafter 0.6 gr. ammonium persulphate is added and the monomer is added in drops during the course of about 2 hours at this temperature. An additional 0.6 gr. of ammonium sulphate is added when all monomers are dropped into the solution. The charge is then put to post-react for 1 to 2 hours, after which it is cooled down.

It will be understood that the foregoing description of the invention and the examples set forth are merely illustrative of the principles thereof. Accordingly, the appended claims are to be construed as defining the invention within the full spirit and scope thereof.

We claim:

1. An article for forming a supporting dressing comprising a woven open mesh fabric of textile material wherein the threads are coated with particles of hard resinous plastic having a softening point of not less than 37° C., said particles being bonded by a binding agent which is dispersible in water and is insoluble in a solvent for the resinous plastic.

2. An article in accordance with claim 1, wherein the plastic is polyisobutylmethacrylate.

3. An article in accordance with claim 1, wherein the plastic is polystyrene.

4. An article in accordance with claim 1, wherein the binding agent is polyvinyl alcohol.

5. An article in accordance with claim 1, wherein the binding agent is casein.

6. An article in accordance with claim 1, wherein the binding agent is a water-soluble cellulose derivative.

7. An article in accordance with claim 1, wherein the binding agent is polyacrylamide.

8. An article in accordance with claim 1, wherein the binding agent is a salt of polymethacrylic acid.

9. An article in accordance with claim 1, wherein the binding agent is polyvinylpyrrolidone.

10. An article in accordance with claim 1, wherein the binding agent is water glass.

11. An article for forming a supporting dressing comprising a woven open mesh fabric of textile material wherein the threads are coated with particles of a hard resinous plastic having a softening point of not less than 37° C., said particles being bonded by a binding agent which is dispersible in water and is a protective colloid material which is insoluble in a solvent for the resinous plastic.

12. An article for forming a supporting dressing comprising a woven open mesh fabric of textile material wherein the threads are coated with particles of polymethylmethacrylate, said particles being bonded by a binding agent which is dispersible in water and is insoluble in a solvent for the polymethylmethacrylate.

13. An article for forming a supporting dressing comprising a woven open mesh fabric of textile material wherein the threads are coated with particles of polymethylmethacrylate, said particles being bonded by a binding agent which is dispersible in water and is a protective colloid material which is insoluble in a solvent for the polymethylmethacrylate.

14. Method of manufacturing an article of the class described which comprises coating textile material with an aqueous emulsion comprising a dispersion of polymethylmethacrylate, including a binding agent which is insoluble in a solvent for the aforesaid plastic.

15. A method in accordance with claim 14, wherein the binding agent is polyvinyl alcohol.

16. A method in accordance with claim 14, wherein the binding agent is casein.

17. A method in accordance with claim 14, wherein the binding agent is water glass.

18. A method of manufacturing a rigid supporting dressing which comprises applying an article in accordance with claim 1 to the part to be supported, the resinous plastic being softened by a solvent, and allowing the solvent to evaporate.

19. A method in accordance with claim 18, wherein the solvent for the plastic includes modifiers to modify the evaporation velocity and the flammability of the solvent.

20. A method in accordance with claim 18 wherein the solvent for the plastic includes modifiers to modify the flammability of the solvent.

21. Method of manufacturing an article of the class described which comprises coating a woven open mesh fabric of textile material with an aqueous emulsion comprising a dispersion of a hard resinous plastic having a softening point of not less than 37° C., said dispersion including a binding agent which is dispersible in water and is insoluble in a solvent for the resinous plastic and also is insoluble in the resinous plastic, drying the thus-coated open mesh fabric to obtain an article wherein the threads of the fabric are coated with the particles of the aforesaid hard resinous plastic, said particles being bonded by the said binding agent.

References Cited in the file of this patent

UNITED STATES PATENTS

| | | |
|---|---|---|
| 2,218,710 | Hermann et al. | Oct. 22, 1940 |
| 2,277,259 | Schnabel | Mar. 24, 1942 |
| 2,582,242 | Eberl | Jan. 15, 1952 |
| 2,603,575 | Schramm | July 15, 1952 |
| 2,697,672 | Rossin | Dec. 21, 1954 |
| 2,773,050 | Caldwell et al. | Dec. 4, 1956 |
| 2,773,781 | Rodman | Dec. 11, 1956 |
| 2,784,111 | Davis | Mar. 5, 1957 |
| 2,790,735 | McLaughlin et al. | Apr. 30, 1957 |
| 2,807,865 | Shippee et al. | Oct. 1, 1957 |